(12) United States Patent
Yagi et al.

(10) Patent No.: US 6,390,918 B1
(45) Date of Patent: May 21, 2002

(54) VIDEO GAME APPARATUS, MODEL DISPLAY METHOD FOR VIDEO GAMES, AND READABLE RECORDING MEDIUM FOR STORING MODEL DISPLAY PROGRAM FOR VIDEO GAMES

(75) Inventors: Koichi Yagi, Kobe; Masahiro Yamamoto, Ibaraki; Tomoharu Okutani, Kyoto, all of (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 09/412,054

(22) Filed: Oct. 4, 1999

(30) Foreign Application Priority Data

Oct. 8, 1998 (JP) .......................................... 10-287126

(51) Int. Cl.⁷ .................................................. A63F 13/00
(52) U.S. Cl. .......................................... 463/32; 463/31
(58) Field of Search ............................ 463/43, 30, 31, 463/32, 33, 34; 345/419, 420

(56) References Cited

U.S. PATENT DOCUMENTS

| | | | |
|---|---|---|---|
| 5,357,604 A | | 10/1994 | San et al. |
| 5,577,960 A | * | 11/1996 | Sasaki .......................... 463/32 |
| 5,581,665 A | * | 12/1996 | Sugiura et al. ................ 395/86 |
| 5,734,807 A | * | 3/1998 | Sumi ........................... 395/127 |
| 5,786,822 A | * | 7/1998 | Sakaibara et al. ........... 345/430 |
| 5,947,823 A | * | 9/1999 | Nimura ......................... 463/32 |
| 6,030,289 A | * | 2/2000 | Nomi et al. ................... 463/32 |

FOREIGN PATENT DOCUMENTS

EP 0807901 11/1997

OTHER PUBLICATIONS

Softimage 3D Design Guide, pp. 40–44. Barry Carlton Ruff/Gene Bodio. Kabushiki Kaisha Born Digital. May 31, 1998.*

* cited by examiner

*Primary Examiner*—Joe H. Cheng
*Assistant Examiner*—Julie Brocketti
(74) *Attorney, Agent, or Firm*—Jordan and Hamburg LLP (57) ABSTRACT

In a video game system, model data and a plurality of arrangement-data groups formed of model numbers, position data, rotation-angle data, and scale data are recorded into a recording medium. An operation detection unit detects an operation on a controller. A viewpoint movement section moves the viewpoint, and a field-of-view determination section determines a model included in the field of view. An instruction control section outputs the arrangement-data group corresponding to this model. An image processing processor converts the coordinate data of each vertex of a plurality of polygons constituting the corresponding model at the position indicated by the position data sent from the instruction control section, according to the rotation-angle data and the scale data, and assigns the texture specified by each texture instruction data to each polygon.

11 Claims, 8 Drawing Sheets

VIDEO GAME APPARATUS, MODEL DISPLAY METHOD FOR VIDEO GAMES, AND READABLE RECORDING MEDIUM FOR STORING MODEL DISPLAY PROGRAM FOR VIDEO GAMES

BACKGROUND OF THE INVENTION

1. Field of the Invention

The present invention relates to video game apparatuses employing an optical disk, a magnetic disk, or a semiconductor memory in which program data is recorded, which are, for example, applied to a video game apparatus using a cassette-type recording medium; model display methods for video games; and readable recording media for storing model display programs used in video games.

2. Description of the Related Art

A number of game systems have been conventionally proposed. They include a system formed of a domestic special unit and a TV monitor, and a system formed of an industrial special unit, a personal computer or a workstation, a display unit, and a sound output unit.

Any of these systems includes a controller for the user to play, a recording medium in which game program data has been stored, a CPU for controlling such that sound and images are generated according to the game program data, a processor for generating images, a processor for generating sound, a monitor for displaying images, and a speaker for outputting sound. As the recording medium, a CD-ROM, a semiconductor memory, or a cassette including a semiconductor memory is mainly used.

In such a game system, a model or a main character, displayed on the monitor as an individual entity, is three-dimensionally formed by a combination of polygons, which are virtual two-dimensional figures of a plurality of triangles or quadrangles, and is displayed as a three-dimensional image by assigning texture data, which is two-dimensional image data, to each polygon.

Therefore, in the above conventional game systems, model data formed of the coordinate data of each vertex of polygons, texture data, and texture instruction data for assigning texture data to each polygon is stored in the recording medium in advance as data which defines the model.

When models which express landforms and structures constituting a game scene are formed of a plurality of polygons three dimensionally, if models having different shapes are displayed on the monitor to give variety to the game scene, since model data needs to be specified for each model and to be stored in the recording medium, a large memory capacity is required for the recording medium. Especially when a semiconductor memory or a cassette including a semiconductor memory is used as the recording medium, it is demanded that the memory capacity required for storing model data be suppressed.

SUMMARY OF THE INVENTION

Accordingly, it is an object of the present invention to provide a video game apparatus, a model display method for a video game, and a readable recording medium for storing a model display program for a video game, which allow a game scene displayed on the monitor to show variety whereas the memory capacity of a recording medium required for storing model data is suppressed.

The foregoing object is achieved in one aspect of the present invention through the provision of a video game apparatus for displaying on display means a game scene including a model viewed from a predetermined viewpoint in a virtual three-dimensional space, the video game apparatus including model-data storage means for storing model data which defines the model; arrangement-data storage means for storing a plurality of arrangement data specified for the model and including position data in the virtual three-dimensional space; and display processing means for displaying the model on the display means by using the model data, each arrangement data, and data related to the viewpoint; and the arrangement data stored in the arrangement-data storage means differs from each other.

According to this configuration, the model data which defines the model and the arrangement data specified for the model and including the position data in the virtual three-dimensional space are stored. A plurality of arrangement data different from each other are stored. Since the model is displayed on the display means with the use of the model data, each arrangement data, and the data related to the viewpoint, the model viewed from the viewpoint is displayed at the position indicated by each position data according to each arrangement data. Therefore, models having the same shape or different shapes can be displayed at the same position or different positions, and game scenes give variety with the same model data being used.

The arrangement-data storage means may store rotation-angle data against a predetermined axis in the virtual three-dimensional space as the arrangement data.

According to this configuration, since the rotation-angle data against the predetermined axis in the virtual three-dimensional space is stored as the arrangement data, the model is displayed in a condition in which the model is rotated by the angle specified by the rotation-angle data against the predetermined axis in the virtual three-dimensional space. When the rotation-angle data of each arrangement data is set differently, models are displayed at the positions indicated by the position data in a condition in which the models are disposed in directions different from each other.

The arrangement-data storage means may store magnification data in the direction of a predetermined axis in the virtual three-dimensional space as the arrangement data.

According to this configuration, since the magnification data in the direction of the predetermined axis in the virtual three-dimensional space is stored as the arrangement data, the model is displayed in a condition in which the model is enlarged or reduced by the magnification specified by the magnification data in the direction of the predetermined axis in the virtual three-dimensional space. When the magnification data of each arrangement data is set differently, models having sizes and shapes different from each other are displayed at the positions indicated by the position data.

The video game apparatus may be configured such that the model-data storage means stores as the model data, the coordinate data of each vertex of a plurality of polygons constituting the model, a plurality of texture data, and a plurality of texture instruction data for assigning texture data to each polygon, and the display processing means includes field-of-view determination means for determining whether the position specified by each position data is located within the field of view at the viewpoint; instruction control means for outputting the data related to the viewpoint and arrangement data including the position data which specifies positions located within the field of view; conversion processing means for converting the coordinate data of each polygon according to the data output from the instruction control means; and mapping processing means for assigning the texture data specified by the texture instruction data to each polygon of which the coordinate data has been converted.

According to this configuration, the coordinate data of each vertex of the plurality of polygons constituting the model, the plurality of texture data, and the plurality of texture instruction data for assigning texture data to each polygon are stored as the model data. It is determined whether the position specified by the position data of each arrangement data is located within the field of view at the viewpoint; the data related to the viewpoint and the arrangement data including the position data which specifies positions located within the field of view are output; the coordinate data of each polygon is converted according to this output data; and the texture data specified by the texture instruction data is assigned to each polygon of which the coordinate data has been converted. Therefore, models located within the field of view can be displayed on the display means in the conditions indicated by the arrangement data.

The foregoing object is achieved in another aspect of the present invention through the provision of a model display method for a video game for displaying on display means a game scene including a model viewed from a predetermined viewpoint in a virtual three-dimensional space, the model display method including the steps of: storing model data which defines the model; storing a plurality of arrangement data different from each other, specified for the model, and including position data in the virtual three-dimensional space; and displaying the model on the display means by using the model data, each of the arrangement data, and data related to the viewpoint.

According to this method, the model data which defines the model and the arrangement data specified for the model and including the position data in the virtual three-dimensional space are stored. A plurality of arrangement data different from each other are stored. Since the model is displayed on the display means with the use of the model data, each arrangement data, and the data related to the viewpoint, the model viewed from the viewpoint is displayed at the position indicated by each position data according to each arrangement data. Therefore, models having the same shape or different shapes can be displayed at the same position or different positions, and game scenes give variety with the same model data being used.

The foregoing object is achieved in still another aspect of the present invention through the provision of a readable recording medium for storing a model display program used in a video game for displaying on display means a game scene including a model viewed from a predetermined viewpoint in a virtual three-dimensional space, the model display program including: model data which defines the model; a plurality of arrangement data different from each other, specified for the model, and including position data in the virtual three-dimensional space; and a display step of displaying the model on the display means by using the model data, each of the arrangement data, and data related to the viewpoint.

When this recording medium is read and executed by a computer, the model data which defines the model and the arrangement data specified for the model and including the position data in the virtual three-dimensional space are read. A plurality of arrangement data different from each other are stored. Since the model is displayed on the display means with the use of the model data, each arrangement data, and the data related to the viewpoint, the model viewed from the viewpoint is displayed at the position indicated by each position data according to each arrangement data. Therefore, models having the same shape or different shapes can be displayed at the same position or different positions, and game scenes give variety with the same model data being used.

DESCRIPTION OF THE PREFERRED EMBODIMENT

Figure 1:
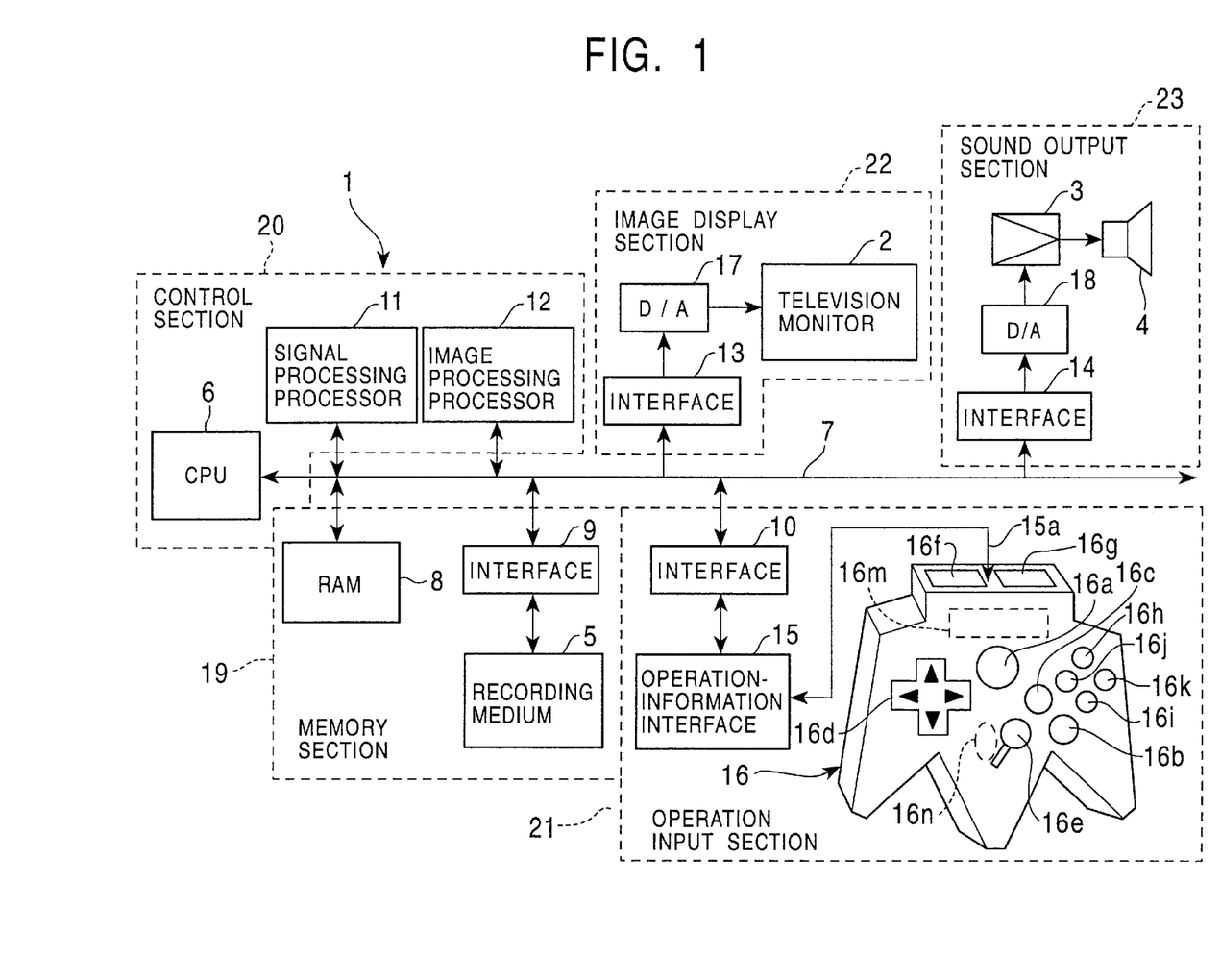
FIG. 1 is a structural view of a game system according to an embodiment of the present invention.

FIG. 1 is a structural view of a game system 1 according to an embodiment of the present invention.

This game system 1 is formed of a game unit, a television monitor (hereinafter called just a monitor) 2 serving as a display unit for displaying a game screen, an amplification circuit 3 and a speaker 4 for outputting the sound of a game, and a recording medium 5 in which a game program formed of image data, sound data, and program data is stored. As the recording medium 5, for example, a so-called ROM cassette, which includes a ROM in which the game program and the program data of an operating system are stored in a plastic case, an optical disk, or a flexible disk is used.

In the game unit, buses 7 formed of a data bus and a control bus are connected to a CPU 6; a RAM 8, an interface circuit 9, an interface circuit 10, a signal processing processor 11, an image processing processor 12, an interface circuit 13, and an interface circuit 14 are connected to the buses 7; a controller 16 is connected to the interface 10 through an operation-information interface circuit 15; a D/A converter 17 is connected to the interface circuit 13; and a D/A converter 18 is connected to the interface circuit 14.

The RAM 8, the interface circuit 9, and the recording medium 5 form a memory section 19; the CPU 6, the signal processing processor 11, and the image processing processor 12 form a control section 20 for controlling a game progress; the interface circuit 10, the operation-information interface circuit 15, and the controller 16 form an operation input section 21; the monitor 2, the interface circuit 13, and the D/A converter 17 form an image display section 22; and the amplification circuit 3, the speaker 4, the interface circuit 14, and the D/A converter 18 form a sound output section 23.

The signal processing processor 11 mainly performs calculation in a three-dimensional space, calculation for converting a position in the three-dimensional space to a position in a dummy three-dimensional space, light-source calculation processing, and sound-data generation and manipulation processing.

The image processing processor 12 performs writing processing of image data to be drawn in a display area of the RAM 8, namely, writing processing of texture data, described later, according to the results of calculation in the signal processing processor 11.

The controller 16 has a start button 16*a*, an "A" button 16*b*, a "B" button 16*c*, a cross-shaped arrow key 16*d*, a stick-type controller 16*e*, a left trigger button 16*f*, a right trigger button 16*g*, a C1 button 16*h*, a C2 button 16*i*, a C3 button 16*j*, a C4 button 16*k*, and a depth trigger button 16*n* as operation means which can be externally operated, and sends the operation signal corresponding to an operation achieved on each button to the CPU 6.

The stick-type controller 16*e* has almost the same structure as a joy stick. More specifically, it has a upright stick which can be tilted in any direction, including forward and backward, and right and left, with a predetermined position of the stick being used as a fulcrum; and sends an X coordinate in the right and left direction and a Y coordinate in the forward and backward direction with the upright position being set to the origin according to the tilt direction and the tilt angle of the stick, to the CPU 6 through the interface circuits 15 and 10.

The controller 16 is also provided with a connector 16*m* where a card-type memory, for example, for temporarily storing the progress condition of a game can be connected.

The game system 1 has different forms according to its uses.

Specifically, when the game system 1 is configured for the home use, the monitor 2, the amplification circuit 3, and the speaker 4 are separated from the game unit. When the game system 1 is configured for the industrial use, the elements shown in FIG. 1 are all accommodated into one cabinet as a unit.

When the game system 1 is configured with a personal computer or a workstation serving as a core, the monitor 2 corresponds to a display unit for the computer; the image processing processor 12 corresponds to a part of the game program data recorded into the recording medium 5 or hardware on an extension board mounted at an extension slot of the computer; and the interface circuits 9, 10, 13, and 14, the D/A converters 17 and 18, and the operation-information interface circuit 15 correspond to hardware on an extension board mounted at an extension slot of the computer. The RAM 8 corresponds to the main memory of the computer or each area of an extension memory.

The present embodiment will be described below with a case in which the game system 1 being configured for the home use is taken as an example.

An outlined operation of the game system 1 will be described next.

When a power switch (not shown) is turned on to power the game system 1, the CPU 6 reads the game program formed of image data, sound data, and program data from the recording medium 5 according to an operating system stored in the recording medium 5. A part or the whole of the read game program is stored in the RAM 8.

Then, the CPU 6 executes the game according to the game program stored in the RAM 8 and an instruction which the game player gives through the controller 16. Specifically, the CPU 6 generates a command serving as a task for drawing or for outputting sound, as required, according to the operation signal which the controller 16 sends based on an operation which the game player performs on the controller 16.

The signal processing processor 11 performs a calculation of the position of a character in the three-dimensional space (of course, also in the two-dimensional space), the light-source calculation, and the sound-data generation and manipulation processing according to the command.

The image processing processor 12 then performs the writing processing of image data to be drawn on the display area (frame buffer) of the RAM 8 according to the calculation results. The D/A converter 17 converts the image data written into the RAM 8 to an analog video signal at a predetermined interval and displays it on the screen of the monitor 2 as an image.

On the other hand, the sound data output from the signal processing processor 11 is sent to the D/A converter 18 through the interface circuit 14, is converted there to an analog sound signal, and is output as sound from the speaker 4 through the amplification circuit 3.

The texture-data writing processing performed by the image processing processor 12 will be described next by referring to FIG. 1.

As described above, the signal processing processor 11 performs the calculation processing according to the command of the CPU 6, and the image processing processor 12 performs the writing processing of the image data to be drawn on the display area of the RAM 8 according to the calculation results.

The RAM 8 has a non-display area and the display area (frame buffer). The non-display area stores polygon data, texture instruction data (texture coordinates), and texture data (such as color data) recorded into the recording medium 5.

Polygons here are virtual polygonal two-dimensional figures constituting an entity specified in a game space, that is, a model or a character. In the present embodiment, they are virtual triangles or quadrangles. The texture data is a two-dimensional figure assigned to a polygon to form an image, and includes color data for specifying the color of an pixel in texture.

The polygon data, which is the coordinate data of each vertex constituting polygons, and the texture instruction data, which specifies texture to be assigned to polygons, are stored collectively.

Commands for drawing generated by the CPU 6 include a command for drawing a solid image by the use of polygons and a command for drawing a usual two-dimensional image.

The command for drawing a solid image by the use of polygons includes polygon-vertex address data on the non-display area of the RAM 8, texture address data indicating the storage position on the RAM 8 of texture data to be assigned to polygons, color address data indicating the storage position on the display area on the RAM 8 of color data specifying the color of texture, and luminance data indicating the luminance of the texture.

Among these data items, the polygon-vertex address data on the non-display area of the RAM 8 is converted to polygon-vertex coordinate data in the two-dimensional space by the signal processing processor 11 by applying coordinate conversion and perspective-projection conversion to polygon-vertex coordinate data in the three-dimensional space sent from the CPU 6 according to the movement-amount data and the rotation-amount data of the screen (viewpoint) itself.

The polygon-vertex coordinate data in the two-dimensional space indicates an address on the display area of the RAM 8. The image processing processor 12 writes the texture data specified by the texture address data assigned in advance into the zone specified by three or four polygon-vertex address data items in the display area of the RAM 8. The specified texture data is assigned to each polygon constituting an entity in this manner to display the entity on the screen of the monitor 2.

Figure 2:
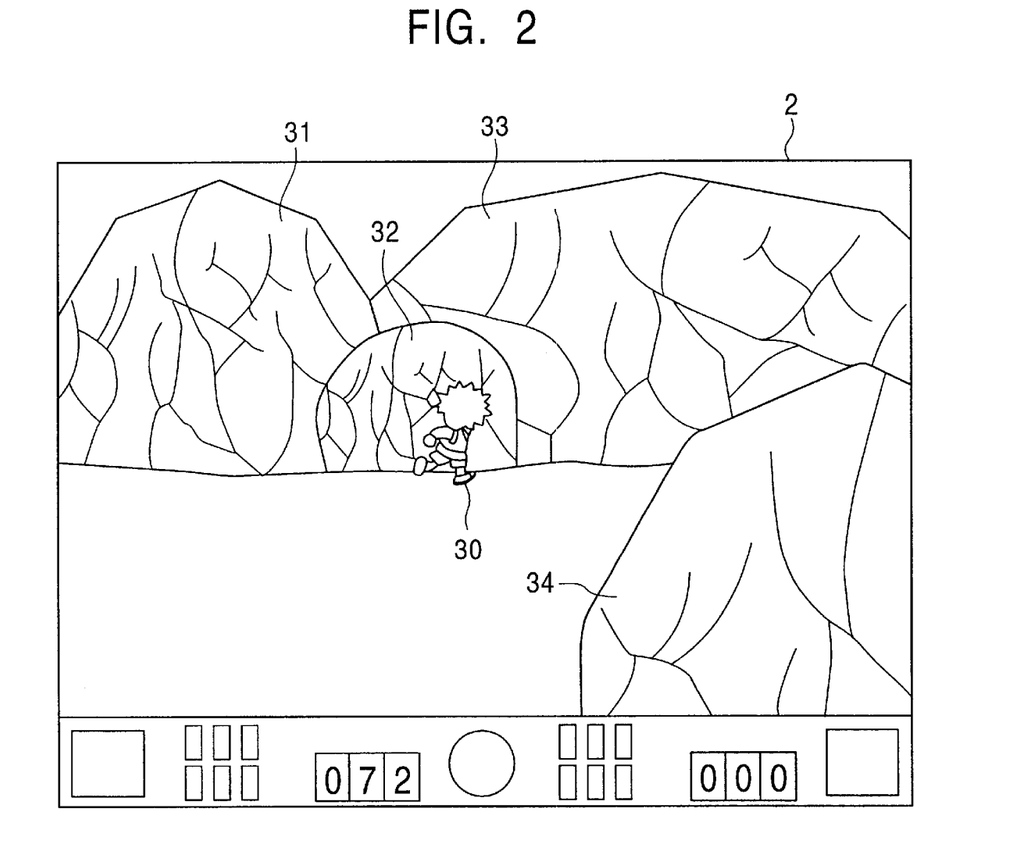
FIG. 2 is a view showing one scene of a video game.

An outline of a video game to be executed in the game system will be described next by referring to FIG. 2. FIG. 2 is a view showing one scene in the game.

In this video game, according to the operations of the game player on the controller 16, the main character fights against an opponent or moves along game scenes (stages) while obtaining items.

As shown in FIG. 2, the main character 30 is displayed, for example, almost at the center of the screen of the monitor 2. Around the main character 30, rock models 31, 32, 33, and 34 are displayed as models showing landforms or structures in a game scene. When the main character 30 is instructed to move according to the operation of the cross-shaped arrow key 16d on the controller 16, for example, the viewpoint used to display the image on the monitor 2 is moved according to the movement of the main character 30, and the game scene shown on the monitor 2 changes.

Figure 3:
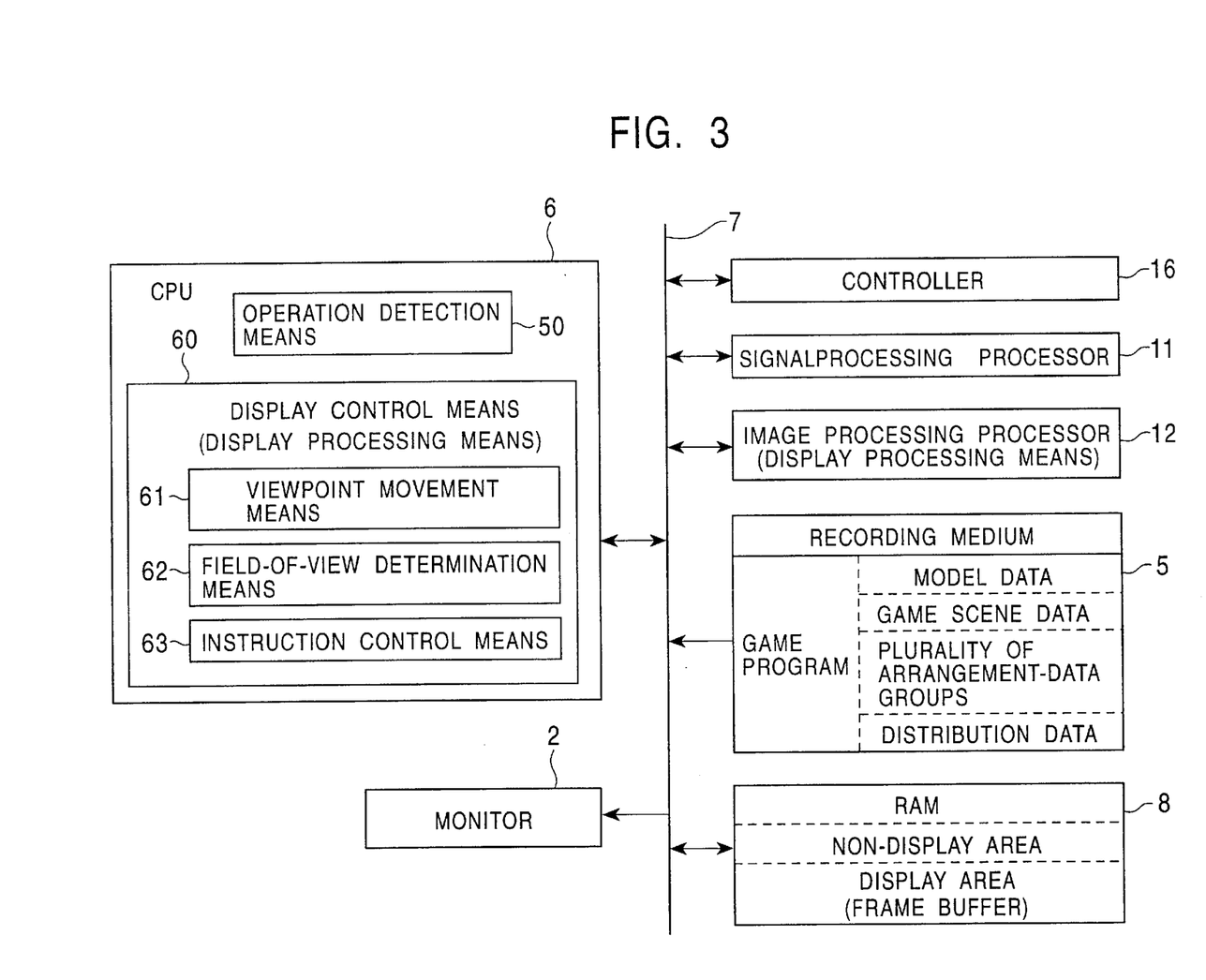
FIG. 3 is a block diagram showing main portions in FIG. 1 and the functional blocks of a CPU.

FIG. 3 is a block diagram showing main sections in FIG. 1 and the functional blocks of the CPU 6.

As described above, the game program of the video game for which an outline has been described above is recorded into the recording medium 5; and the model data which defines the models, more specifically, the polygon data, which is the coordinate data of each vertex constituting the polygons, the plurality of texture data, and the texture instruction data for specifying the texture data to be assigned to the polygons, are stored in the recording medium 5 (model-data storage means) as a part of the game program. Data related to game scenes, a plurality of arrangement-data groups, and distribution data are also recorded into the recording medium 5 (arrangement-data storage means) as a part of the game program.

The data related to game scenes is data related to each game scene displayed in this video game, and includes each lattice coordinate used for dividing each game scene in a lattice manner in the virtual three-dimensional space and data such as the total number of models specified in each game scene.

The arrangement-data groups have model numbers for identifying the models, position data, rotation-angle data, and scale (magnification) data as arrangement data, and indicate the arrangement information of the models identified by the model numbers in the virtual three-dimensional space.

Specifically, the position data (tx, ty, tz) shows the position of a model in the virtual three-dimensional space, the rotation-angle data (rx, ry, rz) shows the rotation angles against the x, y, and z axes, and the scale data (sz, sy, sz) indicates the magnifications in the directions of the x, y, and z axes.

When at least one of the arrangement data items, the position data, the rotation-angle data, and the scale data, is set to another value for the same model number, the model defined by one model data can be shown on the monitor 2 at each position according to each arrangement data.

The distribution data indicates the number of a model included in each area formed by the lattice-manner division, and is specified according to the position data of an arrangement data group. With this distribution data, it can be determined that which model is included in an area.

The CPU 6 controls the operation of each section shown in FIG. 1 according to the game program recorded into the recording medium 5, and is provided with operation detection means 50 and display control means 60 as its functional blocks. The operation detection means 50 detects the operation of the game player on the controller 16 according to the operation signal sent from the controller 16.

The display control means 60 is provided with viewpoint movement means 61, field-of-view determination means 62, and instruction control means 63 as functional blocks. The display control means 60 and the image processing processor 12 form display processing means.

The viewpoint movement means 61 moves the position of the viewpoint used when an image is displayed on the monitor 2 according to the detected operation performed on the controller 16. The field-of-view means 62 determines whether each area formed by dividing a game scene in the lattice manner is included in the field of view seen from the viewpoint, and also determines a model included in the field of view by using the distribution data.

The instruction control means 63 sends the arrangement-data group corresponding to the model determined to be included in the field of view by the field-of-view determination means 62, to the image processing processor 12.

The image processing processor 12 has the following functions.

(1) Function of conversion processing means which converts the coordinate data of each vertex of the plurality of polygons constituting the corresponding model at the position indicated by the position data in the arrangement-data group sent from the instruction control means 63, according to the rotation-angle data and the scale data in the arrangement-data group.

(2) Function of mapping processing means which assigns the texture data specified by each texture instruction data to each polygon.

Display examples of models will be described below by referring to FIG. 2 and FIGS. 4 to 6.

The rock models 31 to 34 shown in FIG. 2 have the same model data, namely, the same polygon data, the same texture data, and the same texture instruction data; and different arrangement-data groups. Therefore, just only one type of polygon data, texture data, and texture instruction data are stored in the recording medium 5 to display the rock models 31 to 34.

The position data in the arrangement-data groups is set, for example, such that the rock models 31 and 33 are placed side by side at a far side (away from the viewpoint) of the rock model 32 and the rock model 34 is placed at a near side (close to the viewpoint) of the main character 30. The scale data of the rock model 33 is set so as to have an extended width of the rock model 31. Therefore, as shown in FIG. 2, the texture on the surface of the rock model 33 also seems to be an extended texture of the surface of the rock model 31 in the horizontal direction.

Figure 4:
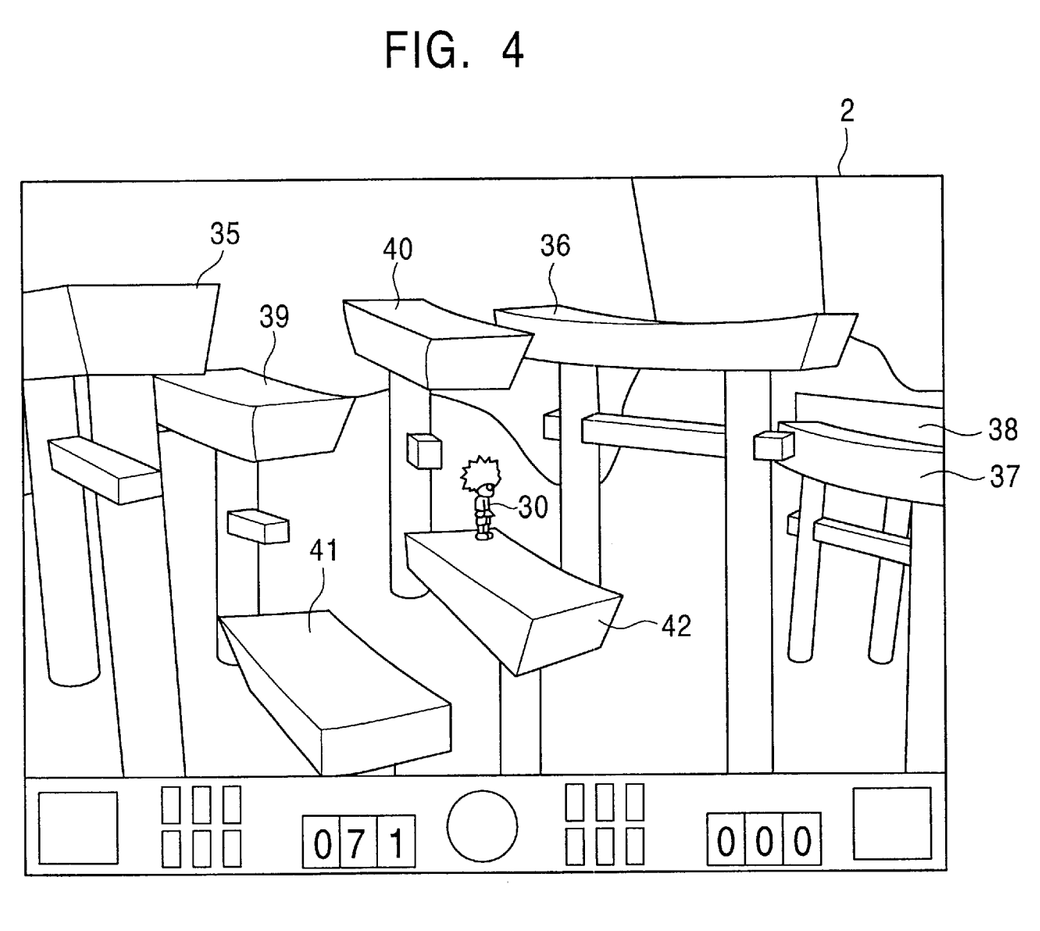
FIG. 4 is a view showing one scene of the video game.

In the same way, shrine-gate models 35 to 38 have the same model data, and divided-shrine-gate models 39 to 42 having shapes obtained by dividing a shrine gate into two sections also have the same model data. Therefore, two types of model data are stored in the recording medium 5 to display the shrine-gate models 35 to 38 and the divided-shrine-gate models 39 to 42. Only the arrangement-data groups of the models 35 to 42 differ.

Figure 5:
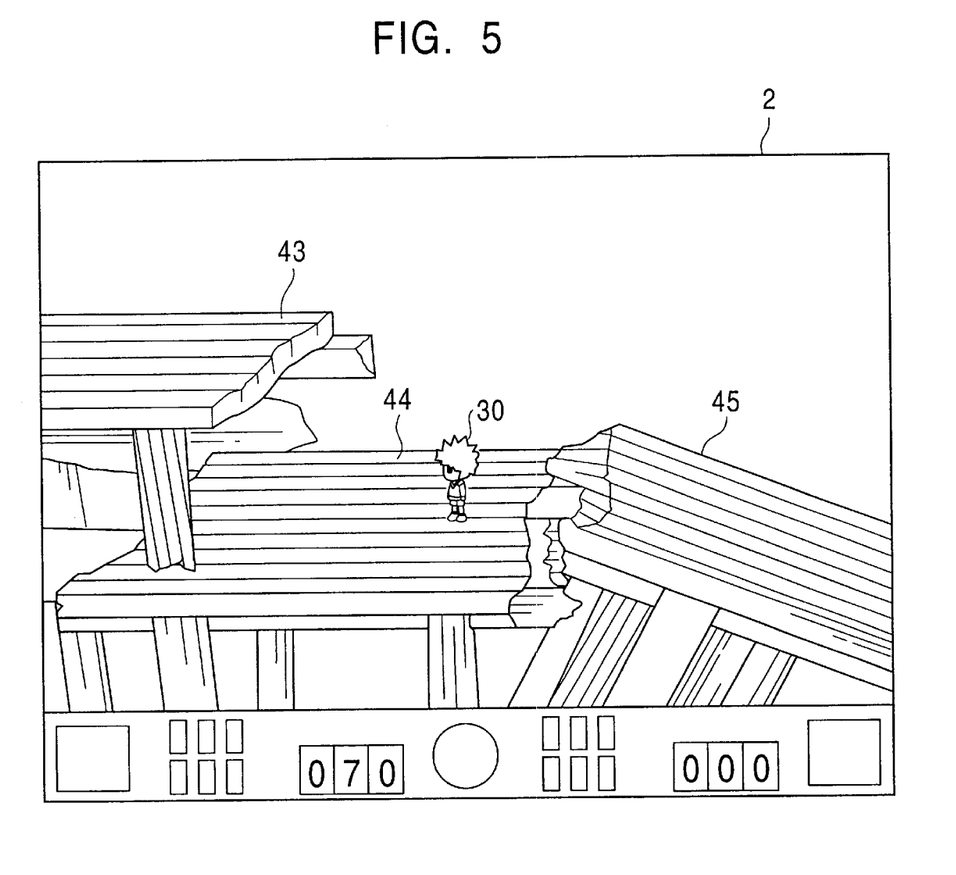
FIG. 5 is a view showing one scene of the video game.

Wooden passages 43 to 45 shown in FIG. 5 have short-dimension shapes with broken right and left ends. Only one type of model data is specified, and their arrangement-data groups differ. Especially the wooden passage 45 has a different rotation-angle data from that of the wooden passages 43 and 44, and is displayed at angle on the screen.

Figure 6:
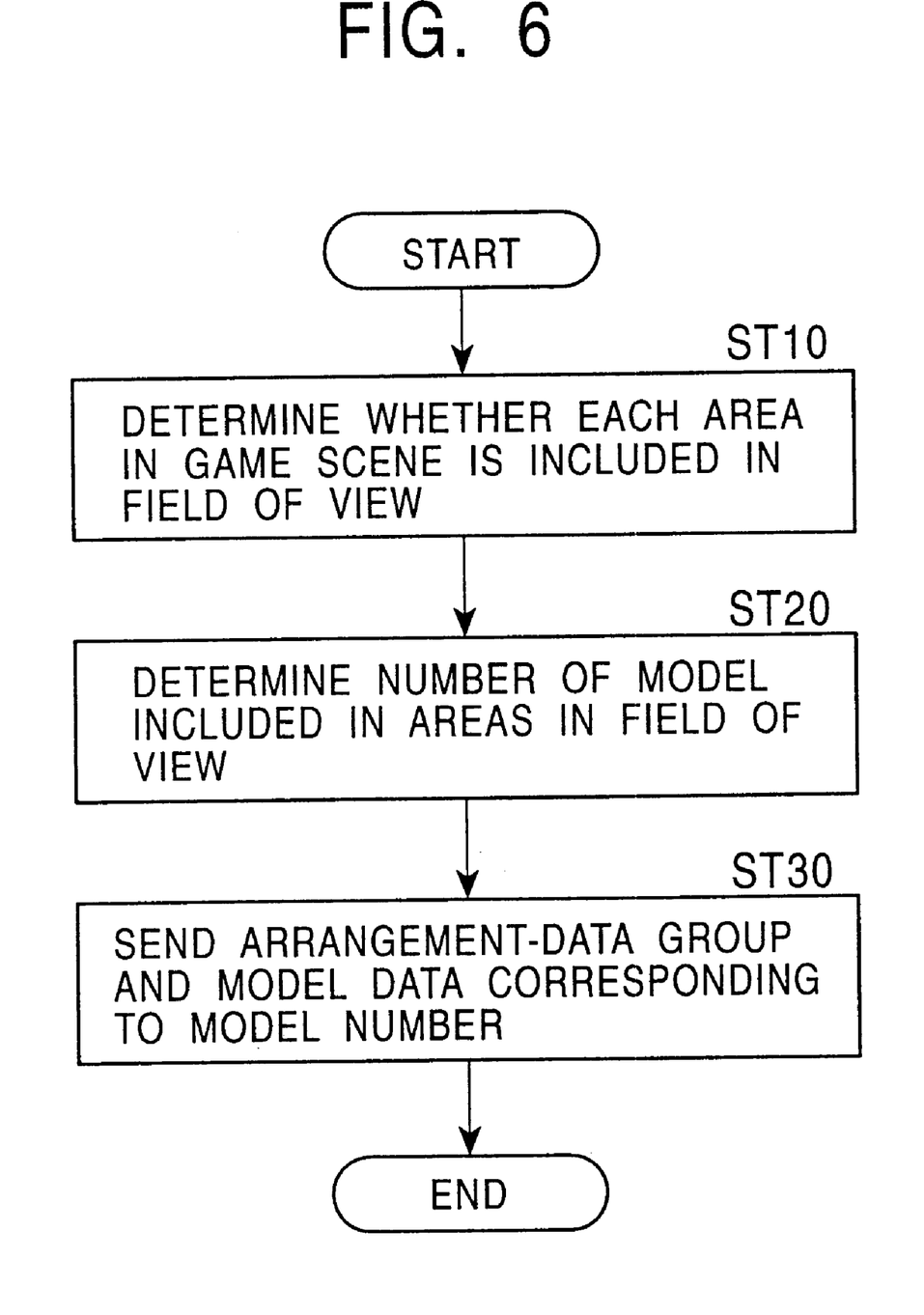
FIG. 6 is a flowchart showing the operation procedure of a model display program.

The operation procedure of a model display program will be described next by referring to a flowchart of FIG. 6.

It is first determined in a step ST 10 from the data related to the game scenes whether each area formed by the lattice-manner division is included in the field of view seen from the current viewpoint. Then, the number of a model included in the areas in the field of view is determined in a step ST 20 with the use of the distribution data. And then, the arrangement-data group and the model data corresponding to this model number are sent to the image processing processor 12 in a step ST 30.

As described above, according to the present embodiment, since a plurality of arrangement-data groups are stored in the recording medium 5 correspondingly to the model defined by one model data item, and the model is displayed on the monitor 2 by the use of the model data and an arrangement-data group, the model having a different shape or a different texture can be displayed on the monitor 2 just by storing one model data item in the recording medium 5. Therefore, an increase of the memory capacity of the recording medium 5, required to store model data defining models, such as polygon data and texture instruction data, is suppressed and game scenes displayed on the monitor 2 can have variety.

Figure 7:
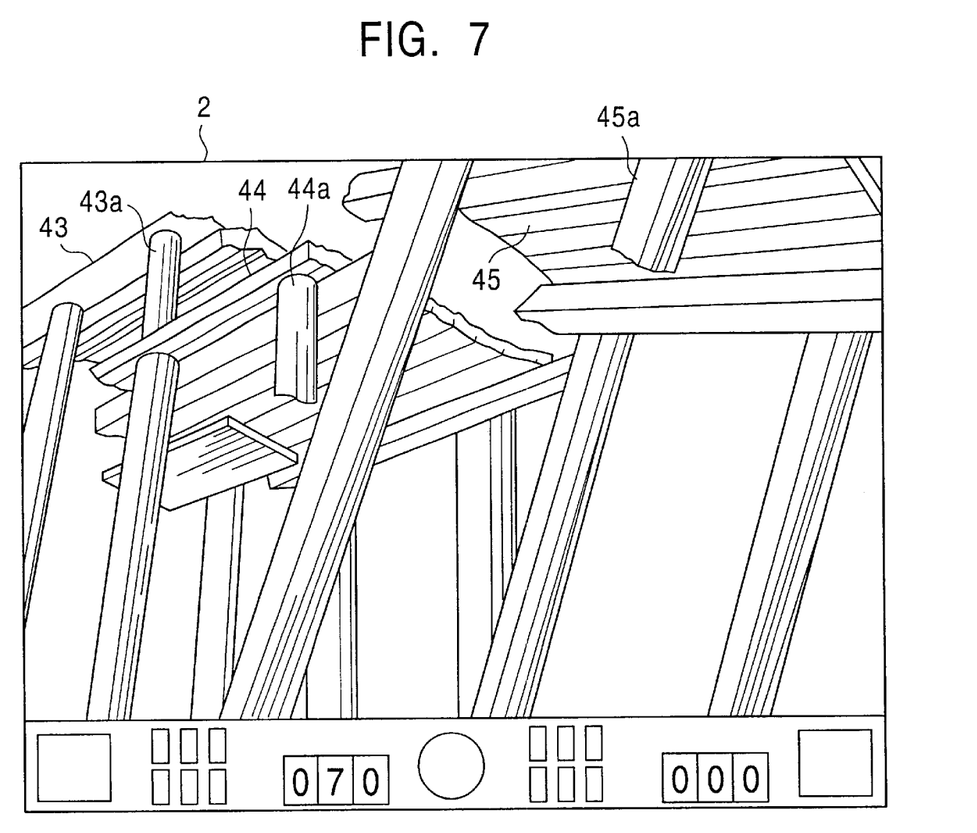
FIG. 7 is a view showing an image obtained by moving the viewpoint downward in FIG. 5.

FIG. 7 shows an image obtained by moving the viewpoint downward and setting the direction of view upward in the image shown in FIG. 5. As shown in FIG. 7, each of the wooden passages 43 to 45 has four legs. Only legs 43*a*, 44*a*, and 45*a* are set short.

When the coordinates of each vertex of a plurality of polygons are specified in this way such that the model has an unsymmetric shape, if the rotation-angle data and the scale data of arrangement-data groups are set differently, models can be displayed on the screen of the monitor 2 as if they had different shapes whereas the same model data is used.

The present invention is not limited to the above embodiment, and can be applied to the following modified embodiments.

Figure 8A:
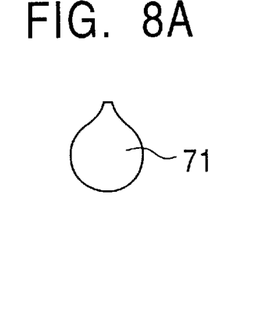
FIGS. 8A and 8B are views showing example modifications of model display.
Figure 8B:
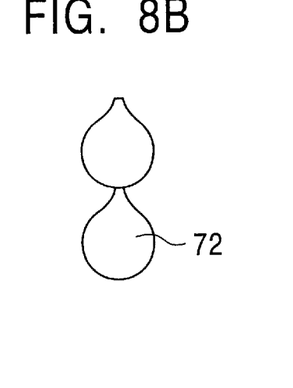

(1) Arrangement-data groups stored in the recording medium 5 are not limited to those specified in the above embodiment. They may be configured such that only position data is specified differently for a model number and the rotation-angle data and the scale data are set to the same values. Alternatively, the arrangement-data groups may have position data only. According to these embodiments, when only the model data of a model 71 having a shape shown in FIG. 8A is specified, for example, if only the position data "tz" is set differently, a model 72 having a sponge-gourd shape can be displayed as shown in FIG. 8B.

Figure 9A:
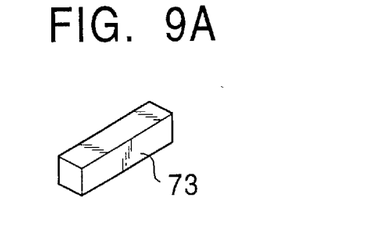
FIGS. 9A and 9B are views showing example modifications of model display.
Figure 9B:
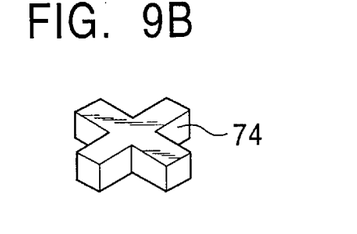

(2) The arrangement-data groups may be configured such that only rotation-angle data is specified differently for a model number and the position data and the scale data are set to the same values. According to this embodiment, when only the model data of a narrow rectangular parallelepiped model 73 shown in FIG. 9A is specified, for example, if only the rotation-angle data "rz" is set differently, a cross-shaped model 74 can be displayed as shown in FIG. 9B. Models having different shapes can be displayed by the use of one model data item combined with arrangement-data groups.

Figure 10A:
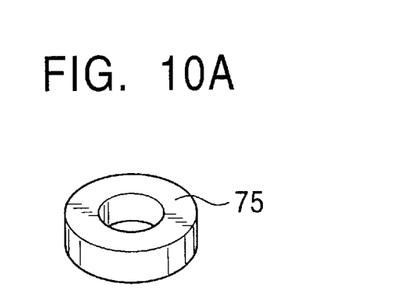
FIGS. 10A to 10C are views showing example modifications of model display.
Figure 10B:
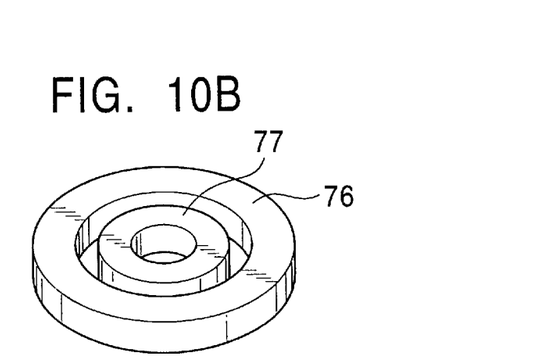
Figure 10C:
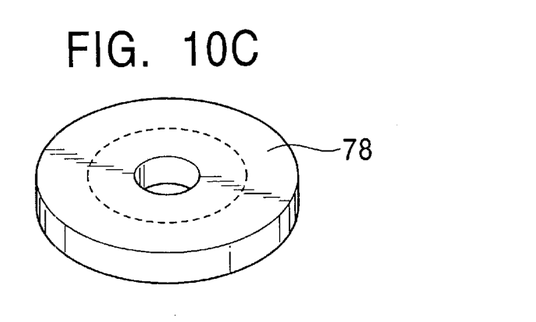

(3) The arrangement-data groups may be configured such that only scale data is specified differently for a model number and the position data and the rotation-angle data are set to the same values. According to this embodiment, when only the model data of a doughnut-shaped model 75 shown in FIG. 10A is specified, for example, if only the scale data "sx" and "sy" is set differently, a large doughnut-shaped model 76 having a small doughnut-shaped model 77 being engaged inside can be displayed as shown in FIG. 10B. When the scale data "sx" and "sy" is set appropriately to make the inner diameter of the large doughnut-shaped model and the outer diameter of the small doughnut-shaped model the same, a doughnut-shaped model 78 having an extended-width ring can be displayed as shown in FIG. 10C. Models having different shapes can be displayed by the use of one model data item combined with arrangement-data groups.

(4) In FIG. 4, the shrine-gate models 35 to 38 and the divided shrine-gate models 39 to 42 are displayed by the use of two types of model data. Instead of this method, the shrine-gate models 35 to 38 may be displayed in a manner in which only the model data of the divided shrine-gate model is provided; the rotation-angle data is set to a value different by, for example, 180 degrees; and the position data is set to an appropriate value. According to this embodiment, models having different shapes can be displayed by the use of one model data item combined with arrangement-data groups.

What is claimed is:

1. A video game apparatus for displaying on display means a game scene including a model viewed from a predetermined viewpoint in a virtual three-dimensional space, comprising:

model-data storage means for storing model data which defines the model;

arrangement-data storage means for storing a plurality of arrangement data specified for the model and including position data in the virtual three-dimensional space; and display processing means for displaying the model as multiple models on the display means by using the model data at respective positions in the virtual three-dimensional space based on the position data stored in said arrangement-data storage means and data related to the viewpoint, wherein the arrangement data stored in said arrangement-data storage means differs from each other.

2. A video game apparatus according to claim 1, wherein said arrangement-data storage means stores rotation-angle data against a predetermined axis in the virtual three-dimensional space as the arrangement data.

3. A video game apparatus according to claim 2, wherein said arrangement-data storage means stores magnification data in the direction of a predetermined axis in the virtual three-dimensional space as the arrangement data.

4. A video game apparatus according to claim 3, wherein said model-data storage means stores as the model data, the coordinate data of each vertex of a plurality of polygons constituting the model, a plurality of texture data, and a plurality of texture instruction data for assigning texture data to each polygon, and said display processing means comprises:

field-of-view determination means for determining whether the position specified by each position data is located within the field of view at the viewpoint;

instruction control means for outputting the data related to the viewpoint and arrangement data including the position data which specifies positions located within the field of view;

conversion processing means for converting the coordinate data of each polygon according to the data output from the instruction control means; and mapping processing means for assigning the texture data specified by the texture instruction data to each polygon of which the coordinate data has been converted.

5. A video game apparatus according to claim 2, wherein said model-data storage means stores as the model data, the coordinate data of each vertex of a plurality of polygons constituting the model, a plurality of texture data, and a plurality of texture instruction data for assigning texture data to each polygon, and said display processing means comprises:

field-of-view determination means for determining whether the position specified by each position data is located within the field of view at the viewpoint;

instruction control means for outputting the data related to the viewpoint and arrangement data including the position data which specifies positions located within the field of view;

conversion processing means for converting the coordinate data of each polygon according to the data output from the instruction control means; and mapping processing means for assigning the texture data specified by the texture instruction data to each polygon of which the coordinate data has been converted.

6. A video game apparatus according to claim 1, wherein said arrangement-data storage means stores magnification data in the direction of a predetermined axis in the virtual three-dimensional space as the arrangement data.

7. A video game apparatus according to claim 6, wherein said model-data storage means stores as the model data, the coordinate data of each vertex of a plurality of polygons constituting the model, a plurality of texture data, and a plurality of texture instruction data for assigning texture data to each polygon, and said display processing means comprises:

field-of-view determination means for determining whether the position specified by each position data is located within the field of view at the viewpoint;

instruction control means for outputting the data related to the viewpoint and arrangement data including the position data which specifies positions located within the field of view;

conversion processing means for converting the coordinate data of each polygon according to the data output from the instruction control means; and mapping processing means for assigning the texture data specified by the texture instruction data to each polygon of which the coordinate data has been converted.

8. A video game apparatus according to claim 1, wherein said model-data storage means stores as the model data, the coordinate data of each vertex of a plurality of polygons constituting the model, a plurality of texture data, and a plurality of texture instruction data for assigning texture data to each polygon, and said display processing means comprises:

field-of-view determination means for determining whether the position specified by each position data is located within the field of view at the viewpoint;

instruction control means for outputting the data related to the viewpoint and arrangement data including the position data which specifies positions located within the field of view;

conversion processing means for converting the coordinate data of each polygon according to the data output from the instruction control means; and mapping processing means for assigning the texture data specified by the texture instruction data to each polygon of which the coordinate data has been converted.

9. A model display method for a video game for displaying on display means a game scene including a model viewed from a predetermined viewpoint in a virtual three-dimensional space, comprising the steps of:

storing model data which defines the model;

storing a plurality of arrangement data different from each other, specified for the model, and including position data in the virtual three-dimensional space; and displaying the model on the display means as multiple models by using the model data at respective positions in the virtual three-dimensional space based on the position data stored by the arrangement data and data related to the viewpoint.

10. A readable recording medium for storing a model display program used in a video game for displaying on display means a game scene including a model viewed from a predetermined viewpoint in a virtual three-dimensional space, the model display program comprising:

model data which defines the model;

a plurality of arrangement data different from each other, specified for the model, and including position data in the virtual three-dimensional space; and a display step of displaying the model on the display means as multiple models by using the model data at respective positions in the virtual three-dimensional space based on the position data shored by the arrangement data and data related to the viewpoint.

11. A video game apparatus for displaying on a display a game scene including a model viewed from a predetermined viewpoint in a virtual three-dimensional space, comprising:

model-data storage means for storing at least one model data which defines the model to be displayed on the game screen;

arrangement-data storage means for storing a plurality of arrangement data specified for the model and including position data and at least one magnification data in a direction of a predetermined axis in the virtual three-dimensional space; and display processing means for displaying the model as multiple models on the display means, based on said model data, at respective positions in the virtual three-dimensional space based on the position data stored in said arrangement-data storage means and data related to the viewpoint, said multiple models including at least one version of said model which is enlarged along said predetermined axis by one of the at least one magnification data based on said model data.

* * * * *